United States Patent
Hamilton, II et al.

(10) Patent No.: US 8,200,529 B2
(45) Date of Patent: Jun. 12, 2012

(54) RANDOM AND DETERMINISTIC TRAVEL FEES

(75) Inventors: Rick A. Hamilton, II, Charlottesville, VA (US); Colin George Harrison, Brookfield, CT (US); Naveen Lamba, Haymarket, VA (US); James W. Seaman, Falls Church, VA (US)

(73) Assignee: International Business Machines Corporation, Armonk, NY (US)

(*) Notice: Subject to any disclaimer, the term of this patent is extended or adjusted under 35 U.S.C. 154(b) by 747 days.

(21) Appl. No.: 12/336,754

(22) Filed: Dec. 17, 2008

(65) Prior Publication Data
US 2010/0153125 A1    Jun. 17, 2010

(51) Int. Cl.
    G07B 15/00    (2011.01)
    G07B 15/02    (2011.01)
(52) U.S. Cl. ............... 705/13; 340/928; 235/384
(58) Field of Classification Search ........ 705/13; 235/384; 340/928
    See application file for complete search history.

(56) References Cited

U.S. PATENT DOCUMENTS

| | | | |
|---|---|---|---|
| 5,717,389 A * | 2/1998 | Mertens et al. | 340/928 |
| 7,215,255 B2 | 5/2007 | Grush | |
| 7,320,430 B2 * | 1/2008 | Dawson et al. | 235/384 |
| 7,966,221 B1 * | 6/2011 | Givoly et al. | 705/26.8 |
| 2002/0072963 A1 | 6/2002 | Jonge | |
| 2002/0115410 A1 | 8/2002 | Higashino et al. | |
| 2004/0119609 A1 * | 6/2004 | Solomon | 340/928 |
| 2004/0212518 A1 | 10/2004 | Tajima et al. | |
| 2005/0168351 A1 | 8/2005 | Saze et al. | |
| 2007/0100687 A1 | 5/2007 | Yoshikawa | |
| 2007/0278300 A1 * | 12/2007 | Dawson et al. | 235/384 |
| 2008/0208680 A1 | 8/2008 | Cho | |
| 2008/0221948 A1 * | 9/2008 | Eglen et al. | 705/7 |
| 2009/0018902 A1 * | 1/2009 | Miller et al. | 705/13 |
| 2009/0295599 A1 * | 12/2009 | Coffee et al. | 340/928 |

FOREIGN PATENT DOCUMENTS

DE    19634340    *    2/1998

OTHER PUBLICATIONS

Matt Yglesias, "I-95 Express Lane Pricing" published Apr. 23, 2011 (pp. 1-4 of 4).*

* cited by examiner

*Primary Examiner* — John Hayes
*Assistant Examiner* — Brian Epstein
(74) *Attorney, Agent, or Firm* — Patrick J. Daugherty; Driggs, Hogg, Daugherty & Del Zoppo Co., LPA (57) ABSTRACT

Methods, including service methods, articles of manufacture, systems, articles and programmable devices are provided for randomly setting a travel fee. A usage attribute of vehicle traffic travelling upon a toll thoroughfare is observed and compared to a threshold. As a function of comparing the attribute to the threshold, a plurality of different toll rates are randomly assigned to each of a plurality of vehicles, each of the vehicles either travelling upon the toll thoroughfare or potentially entering the toll thoroughfare. An occupant of a vehicle is notified of a toll rate randomly assigned, and fees or credits associated with travel by the occupant's vehicle are charged (levied or awarded) at the randomly assigned toll rate.

16 Claims, 5 Drawing Sheets

RANDOM AND DETERMINISTIC TRAVEL FEES

FIELD OF THE INVENTION

The present invention generally describes methods, systems and devices for randomly setting travel fees.

BACKGROUND OF THE INVENTION

Large traffic volumes on public thoroughfares may cause a number of undesired results. In one example, traffic congestion and environmental impacts from vehicle emissions and other pollution generated by vehicle large traffic volumes on public thoroughfares may cause a variety of negative impacts. In order to improve quality of life for users of thoroughfares, as well as for people and areas impacted by their use and operation, it is desired to manage traffic volumes. However, traffic management may be difficult and complex.

More particularly, thoroughfare users have many different travel requirements, options, and habits. Roadway networks may include public roads, regional and intrastate highways, interstate highways, public toll and access roads, private toll and access roads, and each road in a given network may be negatively impacted by traffic carried by or diverted from another road. Traffic problems are not limited to roadways and other forms of public/mass transportation thoroughfares that may experience or cause traffic problems include canals, bridges and ferries. Users may also convey themselves along and to thoroughfares by a variety of means, including apparatuses such as tram, train, bus, lorry, bicycle, wheelchair, taxicab, boat, plane, etc., and as well as self-locomotion by foot.

It is known to set thoroughfare user fees as a function of observed traffic volumes, for example raising fees to discourage use during heavy traffic time periods or lowering fees to encourage additional use during light traffic periods (in one aspect thereby attracting vehicular traffic away from other congested roadways). However, changing toll rates may destabilize traffic flows, in some situations exacerbating undesired traffic flows when too many vehicles respond to toll rate changes by using or avoiding the use of a respective road.

SUMMARY OF THE INVENTION

Methods are provided for randomly setting a travel fee. A usage attribute of vehicle traffic travelling upon a toll thoroughfare is observed and compared to a threshold. As a function of comparing the attribute to the threshold, a plurality of different toll rates are randomly assigned to each of a plurality of vehicles, each of the vehicles either travelling upon the toll thoroughfare or potentially entering the toll thoroughfare. An occupant of a vehicle is notified of a toll rate randomly assigned, and fees or credits associated with travel by the occupant's vehicle are charged (levied or awarded) at the randomly assigned toll rate.

Service methods are also provided comprising deploying applications for randomly setting a travel fee according to the method steps described above, for example by a service provider who offers to implement, deploy, and/or perform functions for others. Still further, articles of manufacture comprising a computer usable medium having a computer readable program in said medium are provided. Such program code comprises instructions which, when executed on a computer system, cause the computer system to perform one or more method and/or process elements described above for randomly setting a travel fee. Moreover, systems, articles and programmable devices are also provided configured for performing one or more method and/or process elements of the current invention for randomly setting a travel fee, for example as described above.

BRIEF DESCRIPTION OF THE DRAWINGS

These and other features of the methods, systems and devices according to the present application will be more readily understood from the following detailed description of the various aspects of the embodiments taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. General Description; and
II. Computerized Implementation.

I. General Description

The present application discloses systems, methods, devices and program products for randomly setting travel fees. As used in the present application, the terms "toll" and "travel fee" refer not only to tolls or other fees associated with specific and designated toll or fee-for-use thoroughfares, but also to any fee or charge, or any credit or benefit, that may be assessed or awarded in association with a thoroughfare by a traveler. For example, a travel fee according to the present invention may comprehend a car-pool credit awarded, or a fee charged or debited from an account) in response to travel on any road, including free-ways and secondary roads, in traveling from an origin point to a destination point, and other examples will be apparent to one skilled in the art. Moreover, the term "enhanced fee" will be understood to comprehend increasing or decreasing a fee, charge, credit or reward associated with travelling.

Although the most common form of a thoroughfare is a road such as a turnpike, references to thoroughfares according to the present invention are not limited to vehicular roadways, and other illustrative but not exhaustive examples include canals, bridges and ferries, as well as mass passenger examples such as planes, trains, buses, lorries, ferries, taxicabs, boats, planes, etc. The term "vehicle" comprehends automobiles as well as buses, boats, trains, lorries and any apparatus configured to carry occupants and passengers along dedicated thoroughfare infrastructure (e.g. railroad tracks), and which also may define a thoroughfare through their regular paths and schedules (e.g. a shipping channel or intercoastal waterway). Thoroughfares and vehicles also comprehend users travelling under their own power (e.g. by bicycle or wheelchair), and also without any apparatus (by foot as a pedestrian over a toll bridge, or onto a ferry, etc.). A toll thoroughfare may generally be understood to comprehend any form of or medium of public transportation that charges travelers or other users a fee, or awards a traveler a credit or other positive benefit, for use thereof: examples include turnpikes as well as any freeway or secondary road for which traffic may be managed by the imposition of a fee or award of a positive benefit.

Automobiles are commonly known powered vehicles and generally desired for use in daily transportation for commuters of all kinds. Growing numbers of vehicles on roadways in many areas cause increases in problems and negative impacts from corresponding increases in powered vehicle traffic congestion and associated environmental pollution. As travelers have many differing travel requirements, options, and habits, management of traffic on thoroughfares such as turnpikes and other public and private toll roads should also contemplate managing traffic flows on toll roads through variable rate setting, for example enabling rate monetary value setting responsive to conditions on other/associated traffic arteries such as other roads (illustrative but not exhaustive examples include public roads, regional and intrastate highways, interstate highways, access roads) and on forms of available mass transportation (illustrative but not exhaustive examples include trains, buses, ferries, etc.). Thus, rates may be lowered to encourage increased traffic on a toll road during low traffic periods, and raised to discourage increased traffic on the toll road during high traffic periods. However, problems may arise in traffic stabilization when shifting variable toll rates upward or downward, for example where changes in traffic flow occur rapidly or disruptively in response to rate changes.

Figure 1:
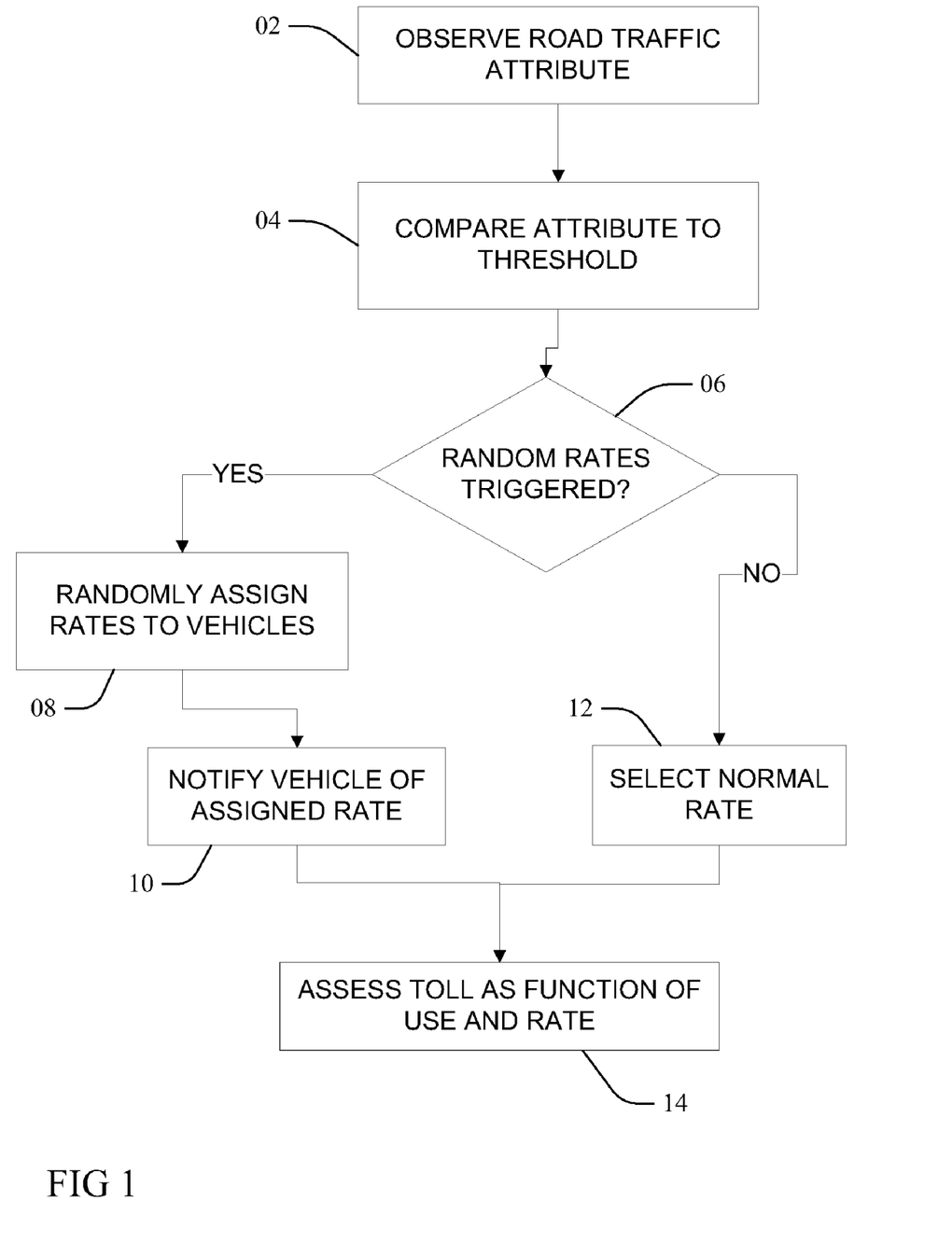
FIG. 1 is a flow chart illustrating a method and system for randomly setting a travel fee according to the present invention.

FIG. 1 illustrates a method and/or system for randomly setting a travel fee according to the present invention. At 02 a usage attribute of vehicle traffic presently travelling upon a toll thoroughfare is observed or determined. Examples of usage attributes include present, past and predicted/future traffic density values, average vehicle speeds, average or observed travel times between given points, times for entry to or exit from the toll road at a given on-ramp or off-ramp, and still other attributes will be apparent to one skilled in the art.

At 04, the observed usage attribute is compared to a threshold or other trigger value or condition, and at 06 if the threshold is met or exceeded or a trigger condition is otherwise met or recognized, then at 08 one each of a plurality of different rates are randomly assigned to each of a plurality of vehicles either travelling upon the toll thoroughfare or potentially entering the toll thoroughfare. More particularly, the plurality vehicles receive a randomized distribution of different toll rates. If random rates have not been triggered at 06, then a normal rate is selected and assigned to each vehicle at 12. At 10 an occupant of a vehicle of the plurality of vehicles is notified of the fee or rate randomly enhanced and assigned to his or her vehicle, in some embodiments prior to an opportunity to enter or exit a roadway subject to the enhanced fee, as is discussed more fully below. Subsequently, at 14 an owner/occupant or other party associated with the vehicle and the use of the toll thoroughfare/infrastructure by the vehicle is charged for said use/travel at the either the rate randomly assigned at 10 or the normal rate selected at 12.

The present invention enables the introduction of a controlled degree of randomness to the assignment of tolls. In contrast to varying a toll by applying a dynamic-but-uniform toll to everyone traveling in a given vehicle type or class (e.g. dependent on a particular vehicle or transportation class/technique in use) from one point to another, at a given time of day, in a given direction, or with respect to any of a variety of other factors, the present invention enables the distributive application of rates selected from a toll cloud centered around a nominal toll value. A toll cloud may be understood as a plurality of different tolls ranging in value and centered upon a nominal toll, the distribution of which among the vehicles may vary. It will also be appreciated that toll cloud distributions may be used in combination with other existing, prior art toll varying techniques.

Randomly varying tolls from a nominal rate in application to individual vehicle travelers and commuters permits finer grain influence and control of the overall traffic flow on a thoroughfare relative to prior art techniques. For example, driver behavior may be more responsive than intended or desired to a given rate change, in some cases resulting in thrashing of traffic flows as tolls vary when too many cars choose to utilize a given toll road or alternate secondary route, more particularly when too many vehicle owner/operators are incented and influenced to the same extent in choosing between a toll road and an alternative route. Varying toll rates applicable to all vehicles, or all of a given class or status, may thus cause relatively large or sudden traffic flow shifts analogous to the effect of a bang-bang controller (as will be readily understood by reference to systems theory), with traffic flow seemingly abruptly switched "on" or "off" as a general rate is increased or decreased.

In contrast, according to the present invention a randomized or deterministic distribution of different toll rates is spread among all vehicles, or through a class or subset of a total vehicular traffic flow (e.g. a subset of all passenger vehicles, all trucks, all commercial vehicles, all single-occupant commuters, etc.). By randomly or deterministically distributing incentive rates (e.g. a rate relatively higher than a nominal/base rate chosen to decrease toll road traffic, or a rate relatively lower than a nominal/base rate chosen to increase toll road traffic) to a group smaller than a totality of the traffic flow or subset thereof the present invention avoids stimulating too many vehicles to react the same way, in some embodiments enabling disbursing resultant incentivized behavior across a range of commuters or even road systems.

Figure 2A:
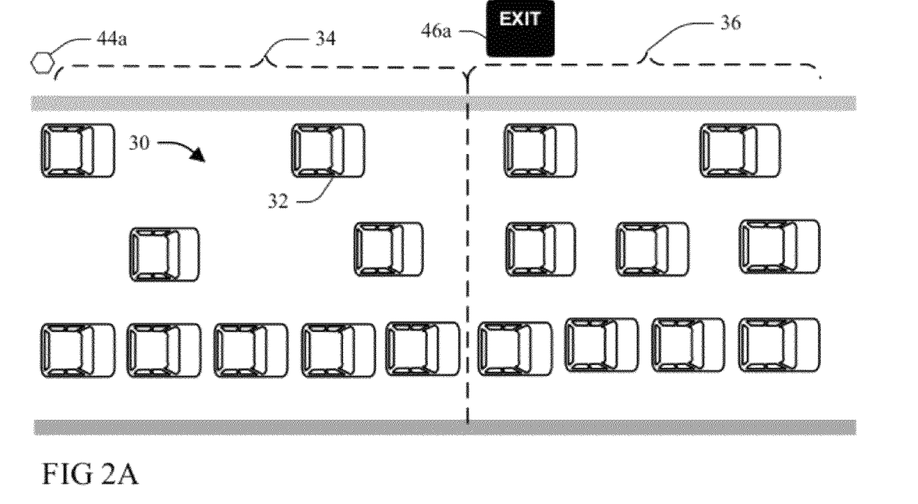
FIGS. 2A and 2B are diagrammatic illustration of an implementation of a method or system for randomly setting a travel fee according to the present invention.
Figure 2B:
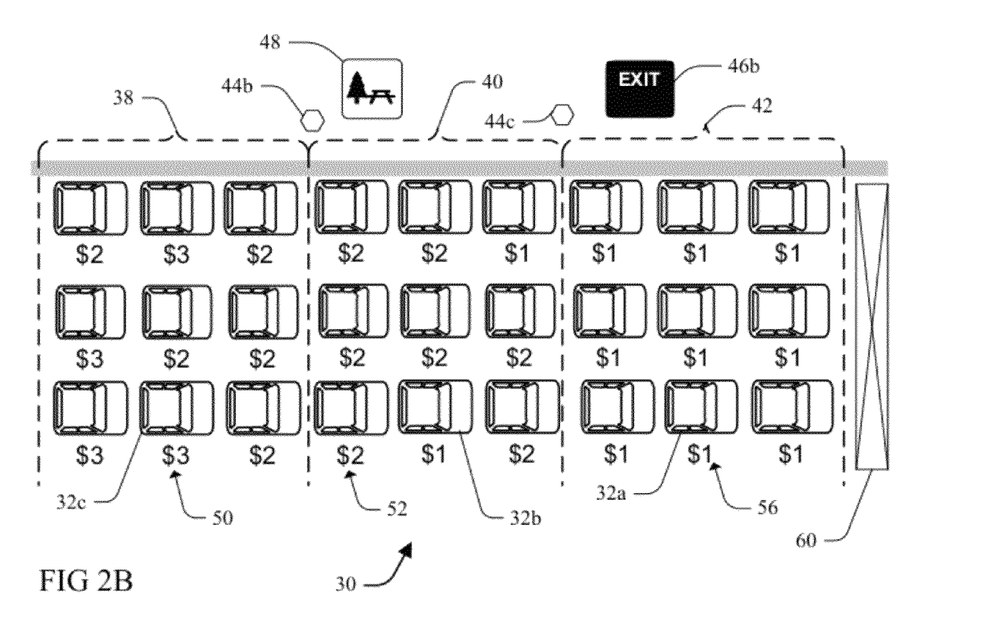

FIGS. 2A and 2B provide an illustration of an embodiment of a random or deterministic toll distribution according to the present invention applicable to a toll road 30, wherein tolls for use of the toll road 30 are not uniform but rather are distributed differently to different vehicles 32, and wherein the distribution of the different tolls is further varied to encourage or ensure one or more desired mixes of traffic on the toll road 30 or between the toll road 30 and other alternative routes (not shown). As discussed above with respect to FIG. 1, a usage attribute of the toll road 30 indicative of traffic flow on the road 30 is observed, monitored or other wise determined. Some embodiments sample vehicle 32 traffic over one or more segments 34/36/38/40/42 of the road 30 to determine a toll road 30 usage average vehicle density or average vehicle speed. The segments 34/36/38/40/42 may be defined in a variety of ways, for example as delineated or bounded by distance indicators including mile markers 44, or with respect to ingress or egress ramps 46.

Thus, in one example, an observed/determined average vehicle speed over segment 34 of FIG. 2A greater than a nominal/expected/baseline speed for the road 30 or segment 34/36/38/40/42 may be directly correlated with or determinative of less vehicle density over said segment 34 and/or as extrapolated to other of the segments 36/38/40/42 or the road 30 itself. Alternatively, an observed/determined average vehicle speed over segment 36 of FIG. 2A lower than the nominal/expected/baseline speed may be directly correlated with or determinative of high vehicle density, congestion or poor road condition over said segment 36 (and/or as extrapolated to other of the segments 34/38/40/42 or the road 30), such that a reduction of traffic in the segment is desirable. In some embodiments a road 30 usage attribute may be determined through a combination of samples and determinations of multiples of the segments 34/36/38/40/42, for example by averaging weighted/non-weighted samples.

FIG. 2B illustrates a random or deterministic distribution of toll rates to vehicles 32 over the segments 38/40/42 in response to the sampling of the segments 34/36 in FIG. 2A. (Although in the present example the rate-distributed segments 38/40/42 are different from the sampled segments 34/36, it will be appreciated that any of the sampled or rate-distributed segments 34/36/38/40/42 may be one and the same.) In the present example, the usage attribute determined from the segment 34 and/or segment 36 or combination thereof indicates heavy traffic on the toll road 30, triggering a distribution of some enhanced toll rates 50 and 52 different from a nominal/base rate 56 in order to reduce or increase traffic on the road 30 segment 42. The present example provides for enhanced toll rates 50 and 52 that are each higher than the nominal/base rate 56 in order to reduce traffic on the road 30 segment 42; however, in other examples the enhanced toll rates 50 and 52 may each be lower than the nominal/base rate 56 in order to encourage an increase in traffic on the road 30 segment 42 where a usage attribute indicates underutilization, and thus the term "enhanced" may be understood to connote any difference in assessed value from the base/nominal rate.

More particularly, as the vehicles 32*a* within segment 42 have already passed an exit opportunity 46*b*, they cannot avoid or otherwise be incented not to use the segment 42, so each is charged only the nominal rate 56, presently US$1.00. In contrast, the vehicles 32*b* within the segment 40 have an ability and opportunity to exit at exit 46*b* prior to travelling on the segment 42, so according to the present invention a first enhanced toll fee 52 (presently US$2.00) is distributed with notice to some of the vehicles 32*b* (for example at 10 of FIG. 1 discussed above), with others only charged the nominal rate 56. The vehicles 32*c* within the segment 38 have both the opportunity to exit at exit 46*b*, as well as another rest stop opportunity 48, prior to travelling on the segment 42. As each of these vehicles 32*c* have greater opportunities to avoid use of the segment 42 (and in another aspect also have more time to react to a notification of the enhanced rates 50 or 52 and plan accordingly) one of the first enhanced toll fee 52 and a higher second enhanced toll fee 50 (presently US$3.00) is distributed to each of the vehicles 32*c*, with none of said vehicles 32*c* enjoying the nominal rate 56.

In the present embodiment, vehicles 32*c* having greater opportunities to avoid (e.g. more exits, time to react, less inconvenience in reacting, etc.) prior to travelling on the segment 42 experience a different random or deterministic toll rate distribution than the vehicles 32*b* within the segment 44*c*. The relatively divergent toll distributions of segment 38/40/42 may be a result of different usage attribute triggers: in one example a first vehicle density or average travel speed observation at segment 36 of FIG. 2A causes otherwise nominal toll rate 56 setting to become a randomly disbursed nominal rate 56/first enhance toll 52 distribution over the segment 40, and wherein a second vehicle density or average travel speed observation/trigger with respect to segment 34 of FIG. 2A causes the randomly disbursed first enhance toll rate 52/second enhanced rate 50 distribution over the segment 38.

Thus, in one aspect, a signaling of a specific price to a vehicle 32 occurring while the vehicle 32 is still sufficiently far from a controlled area or segment 42 wherein a driver is easily able to choose alternate routes may be determinative of a toll rate distribution, for example considering whether route choice opportunities include driving through two or more controlled areas' egress and ingress points (e.g. entrance and exits 46 or 48), thus as a function of choices presented to a vehicle driver to facilitate a rational choice. Commuters may also be presented with an overall end-to-end charge or rate for a commute or other trip upon the road 30 so that an otherwise favorable initial choice at a lower toll road route will not later lead unfairly to a substantially higher toll as conditions change.

A degree of randomness and disbursement quantity of each rate 50/52/56 may be determined and adjusted in real-time based on the current traffic conditions (and in some examples also as a function of a predictive element or factor), and may further be modified through feedback mechanisms regarding the effectiveness of a present, current or past random disbursements in affecting traffic patterns in the desired manner. In some embodiments, disbursement of random tolls be related to, proportional to or a function of usage attributes on a sliding scale. Thus, in one example, higher tolls are distributed more often in response to moderate-to-severe congestion traffic observations relative to distributions in response to low-to-moderate congestions; nominal tolls are most often distributed under normal conditions with little or no congestion; and a toll rate lower than the nominal rate may be dispersed with good traffic conditions coupled with observed increasing usage, and distributed even more often in response to good traffic conditions coupled with declining usage.

In some embodiments, deterministic elements may be introduced in affecting random distributions across a given set or pool of vehicles, thus combining random and deterministic/contrived techniques. For example, some vehicles (and/or owners/operators/etc. associated therewith) may receive preferential treatment, or increased pricing relative to others. In some examples where a need to offer periodic reduced or increased toll fees is triggered or otherwise recognized preferred vehicles/occupants/owners/etc. may constitute or be defined as a first collective plurality to receive a reduced or increased rate. Preference may be dictated by a variety of criteria, and illustrative but not exhaustive examples include type of vehicle, an emissions characteristic of the vehicle, a fuel efficiency of the vehicle, historical road use (e.g. a vehicle 32 that typically travels over only two exits 46 down the road 30 may have a different affect on traffic, and thus a different preference status, relative to one historically travelling farther), driving history (e.g. a driver with a high accident risk rating may be more strongly discouraged from traveling on the toll road 30 during peak traffic periods with a different preference status resulting in higher frequencies of higher toll rate assignments), and still other factors and attributes will be apparent to one skilled in the art. In some examples, vehicles/occupants/owners/etc. may also be selected for participation in a first collective that is randomly (or specifically) receiving higher tolls, while other vehicles/occupants/owners/etc. meeting preferential criteria are included in another second collective that is randomly receiving nominal or discounted toll rates, and wherein all other vehicles/occupants/owners/ etc. not in either the first or the second collective randomly receive one of the possible rates.

The present invention, independently or in conjunction with other variable toll rate management systems, may thus provide an overall smoothing of traffic flow over a toll road and proximate alternate routes, and in particular by introducing responsive feedback inputs. Thus, in one implementation, toll rates applied to vehicles/occupants/owners/etc. are randomly varied based on current toll road 30 and alternate route (not shown) capacities: for example, as an observed toll road 30 congestion decreases and/or average speed increases enhanced rate values randomly applied may move from a pervasive distribution of the second enhanced toll rate 50 to an occasional distribution of the first relatively lower enhanced toll rate 52; and further, if congestion continues to decrease then a larger number of the vehicles 32 may be assigned/offered the second enhanced toll rate 50, the distribution perhaps dropping down to a more pervasive assignment/offering of the lower nominal rate 56 when traffic is extremely light. Embodiments of the present invention may also alternate between rates and random disbursement of such rates as traffic patterns dictate. A predictive element may also be introduced into a rate distribution, for example one that takes into account a number of vehicles already committed to entering the toll road 30 (e.g. cars waiting or in close proximity to a main toll plaza 60 or toll road exit/entrance ramp 46b) of the road 30, thereby responding to a historic or likely effect on road 30 traffic congestion represented thereby.

Rate differences and distributions may be achieved through pre-determination or dynamic determinations from standard deviations or other measures of variance, and relative toll increments between different distributed rates may also vary in minute quantities or small percentages (e.g. single-digit percentages) or by larger and/or standardized toll values (e.g., by 25%, 100% or even larger). Referring now to the example illustrated in FIG. 3, distributions and rate values may also be set iteratively through feedback mechanisms. Thus, at 102 nominal toll rates are applicable to all traffic (e.g. travelers, apparatuses, vehicles, boats, pedestrians, etc.) traveling on a toll thoroughfare, the traffic monitored at 104. At 106 the traffic monitoring comprises an analysis of monitoring data to determines whether any traffic flow attribute triggers a random and/or deterministic distribution of different toll rates according to the present invention (for example as discussed above), or a revision of a random and/or deterministic distribution already in effect; if no trigger or revision indication is determined, then no action is taken with respect to the present toll rates at 110 and monitoring continues at 104.

Figure 3:
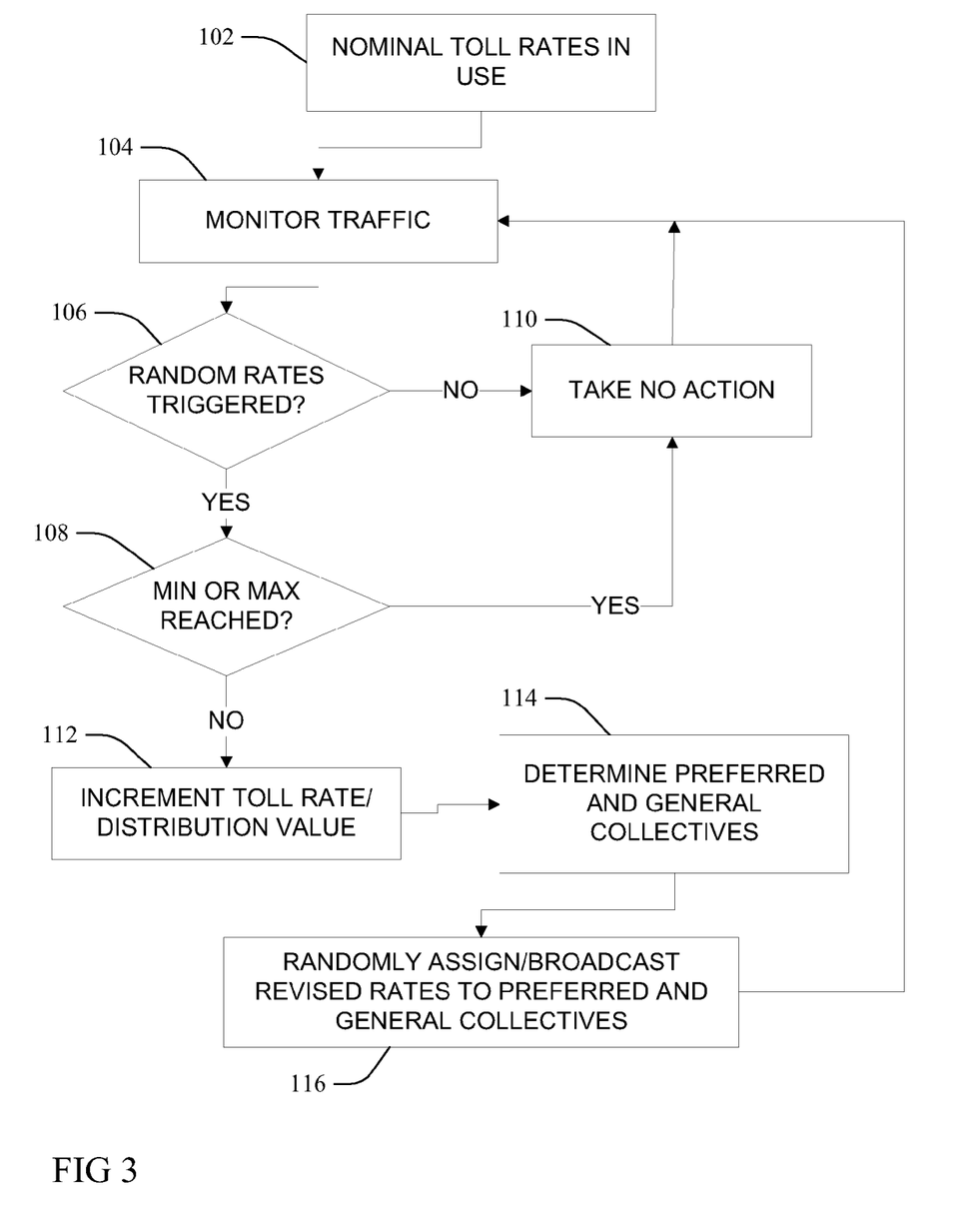
FIG. 3 is a flow chart illustrating an implementation of a method or system for randomly setting a travel fee according to the present invention.

When the analysis at 106 determines instead that a trigger of random and/or deterministic toll rates is warranted, or an adjustment/revision of a random and/or deterministic distribution already implemented is indicated, then at 108 the present rates or distribution thereof are/is compared to specified boundaries or limits. For example, if the first and second enhanced rates 52 and 50 of FIGS. 2A and 2B are already in effect, and the second rate 50 is be specified as the maximum rate selectable for distribution, and a frequency of distribution among the vehicles 32 or subsets thereof has reached a maximum distribution frequency, then it may be determined at 108 that no further rate actions are permissible and no action is taken at 110. If however further rate values and/or distributions thereof may be achieved in view of specified limits at 108 then at 112 the rate values and/or distributions thereof are incremented; for example, a percentage value of traffic upon the thoroughfare subject to random enhanced or reduced toll fares may be increased or decreased by an incremental value, additional fares may be created for distribution, or the value of an enhanced or reduced fare may be changed by an incremental value.

At 114 preferred and general collectives of the traffic population may be determined or revised, and the enhanced or reduced fares distributed randomly with respect to each group pursuant to divergent group rules at 116, for example as discussed above with respect to preferences. Monitoring of traffic then continues at 104, in one aspect determining traffic behavior in response to the rate distributions accomplished in the previous iterations of the processes and systems at 112, 114 and 116, and thus providing feedback for a subsequent triggering of a future iteration of new/revised rate distributions at 106.

Rates randomly and/or deterministically distributed to toll thoroughfare travelers may be published to travelers using a variety of means. For example, referring now to FIG. 4, as a vehicle 32 of FIG. 2A or 2B travels along on or approaches an ingress point to the toll road 30, notice in real-time of a toll rate randomly distributed to the vehicle 30 may be provided to a vehicle occupant 122 through a variety of visual or auditory means: illustrative but not exhaustive examples include a in-dash displays and audio information provided by an automobile data or GPS system 128 (for example, an OnStar® or Garmin® system; ONSTAR is a trademark of the OnStar Corporation in the United States, other countries, or both; and GARMIN is a trademark of Garmin Ltd. in the United States, other countries, or both); by a broadcast or satellite radio system 129; by a personal data device 130 (e.g. a personal digital assistant (PDA) device, a personal computer or a cellular telephone device); and by communications from a vehicle toll transponder 162 from a toll thoroughfare transponder 164 provided along the toll road 30. Each of the devices 128/129/130/162/164 may be in wired or wireless data communication with a toll thoroughfare authority or service provider 136 who provides toll rate assignments, distributions or updates to any one of the devices 128/129/130/162/164. Travel safety may also be enhanced by configuring any one of the devices 128/129/130/162/164 to communicate toll rate information through an audio message 138 to the vehicle operator 122 through amplified speaker means 137 of, or in wired or wireless communication with, any of the devices 128/129/130/162/164 and the service provider 136.

Figure 4:
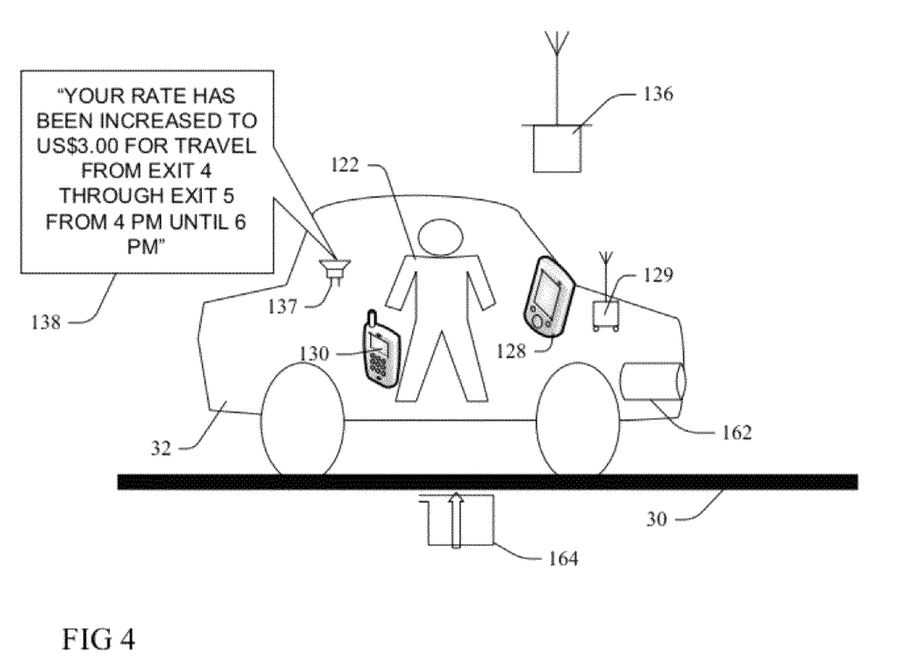
FIG. 4 is a diagrammatic illustration of a system or device configured to enable randomly setting a travel fee according to the present invention.

Tolls may be collected/rewarded using manual and automated devices and systems, including fare boxes and automated toll collection systems (ETC), for example incorporating EZ-Pass® and/or SunPass® systems and the like (EZ-PASS is a Trademark of the EZ-Pass Interagency Group in the United States and/or other countries; SUNPASS is a trademark of the Florida Department of Transportation in the United States and/or other countries). Global Positioning Satellite (GPS) systems may also be used to track vehicle road use independent of toll road use and associated ETC systems, thus extending toll, fees and credit awards according to the present invention beyond conventional toll thoroughfares. Such automated embodiments offer advantages in enabling simplified implementation, management, and modification of variable rate tolls. In one embodiment discounts are only available to commuters equipped to use an ETC/GPS system, and in another embodiment a higher toll is paid by those commuters not equipped for ETC or GPS. In other examples a one-time discount, a temporarily reduced toll fee or a long term reduced toll fee is offered to entice commuters to switch to automated ETC or GPS systems. ETC and GPS systems may also comprehend municipal parking collection systems; vehicle service, fueling or charging stations, for example incorporated into automated fueling pumps or charging stations. Toll fees may also be assessed and collected through other payment and debiting systems and events, for example upon payment of taxes, renewal of a drivers license, payment of regulated utility bill, and the like; or tolls may be invoiced for remittance by the vehicle 32 owner or operator, or even passenger thereof 122.

Figure 5:
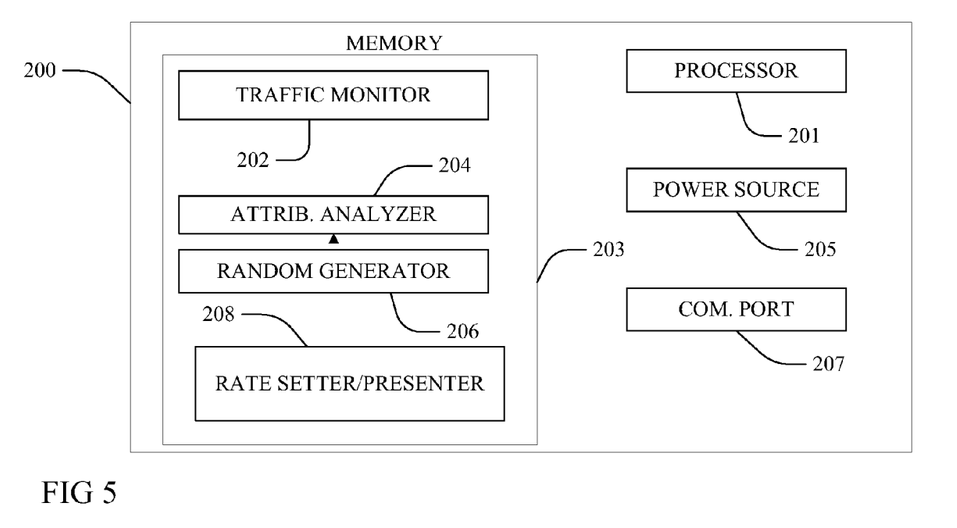
FIG. 5 is a block diagram illustrating a programmable device that randomly sets travel fees according to the present invention.

FIG. 5 illustrates a programmable device or module 200 configured to randomly set travel fees according to the present invention, for example as illustrated in FIGS. 1-4 and described above. The device 200 may be incorporated into a large system wherein other components of the system accomplish systems and methods according to the present invention, or it may be a stand-alone device or module configured to perform each of the systems and methods, such as the transponder device or module 162/164 of FIG. 4. The present embodiment comprises a central processing unit (CPU) or other processing means 201 in communication with a memory 203, the memory 203 comprising logic components that enable the CPU 201 to perform processes and methods according to the present application. The memory 203 comprises logic components configured to perform the processes discussed above, including those described with respect to FIGS. 1-4, including a traffic monitor logic component 202 configured to monitor thoroughfare traffic; a traffic flow attribute analyzer logic component 204 configured to analyze the monitored traffic flow for triggering conditions; a random rate and distribution engine logic component 206 configured to set or select rates and randomly and/or deterministically distribution said rates to thoroughfare travelers; and a rate setter/presenter logic component 208 configured to apply the rate to given travelers and notify them of the applied rate. A power unit 205 is configured to provide operative power to the device 200; examples include battery units 205 and power inputs configured to receive alternating or direct current electrical power, and other appropriate power units 205 will be apparent to one skilled in the art. A communication port or network link/node means 207 is also provided and configured to enable network and other communications with other devices, systems, monitoring, administrative and service provider entities, as well as others as appropriate.

II. Computerized Implementation

Figure 6:
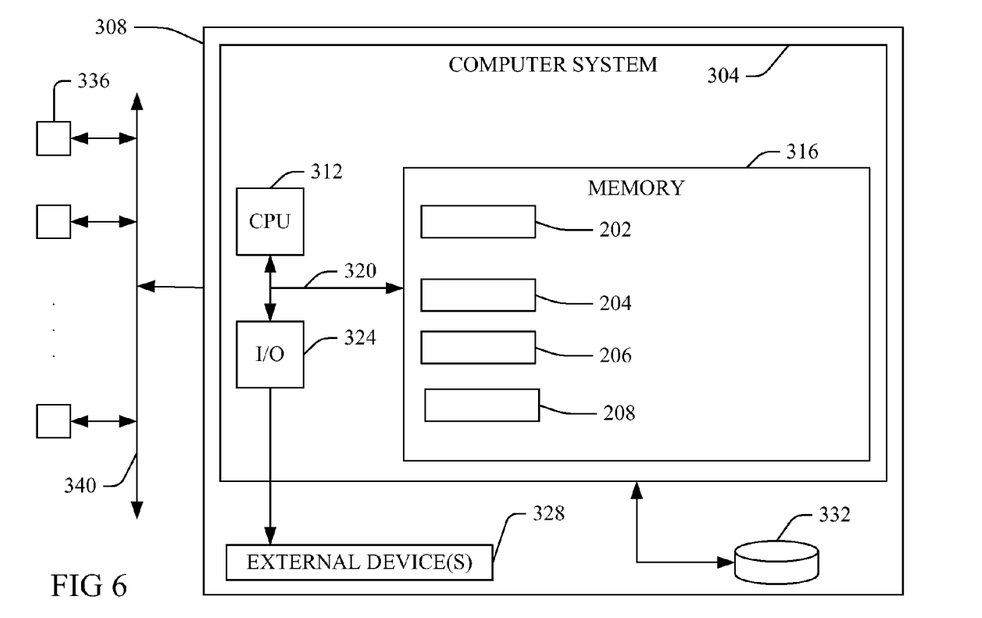
FIG. 6 is a block diagram illustrating a computerized implementation of a method and system that randomly sets a travel fee according to the present invention.

Referring now to FIG. 6, an exemplary computerized implementation of the present invention includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and systems, and devices as illustrated in FIGS. 1-5 and described above, including the traffic monitor logic component 202, the traffic flow attribute analyzer logic component 204, the random rate and distribution engine logic component 206 and the rate setter/presenter logic component 208, discussed above and which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 4 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement methods, systems and devices according to the present application, for example as illustrated in FIGS. 1-5 above and described otherwise herein. To this extent, the computer-readable/useable medium includes program code that implements each of the various process steps of the present application.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.).

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the figures, may be distinguished or otherwise identified from others by unique adjectives (e.g. a "first" element distinguished from another "second" of a plurality of elements, a "primary" distinguished from a "secondary," an "another", etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for randomly setting a travel fee, comprising:
observing by a processing unit a usage attribute of vehicle traffic travelling upon a toll thoroughfare;
comparing by the processing unit the observed usage attribute to a threshold;
randomly assigning by the processing unit each one of a plurality of different toll rates to each of a plurality of vehicles as a function of comparing the observed usage attribute to the threshold, each of the plurality of vehicles either travelling upon the toll thoroughfare or potentially entering the toll thoroughfare;
notifying by the processing unit an occupant of a vehicle of the plurality of vehicles of a one of the plurality of toll rates randomly assigned to the occupant's vehicle; and
charging for travel by the occupant's vehicle at the one randomly assigned toll rate.

2. The method of claim 1 wherein the usage attribute is selected from the group comprising a traffic density value, an average vehicle speed, an average vehicle travel time, an average time for a vehicle to enter the toll thoroughfare, and an average time for a vehicle to exit from the toll thoroughfare.

3. The method of claim 2, the randomly assigning each of the plurality of different toll rates comprising randomly distributing a first enhanced rate to each of a first group of the plurality of vehicles and a nominal rate to a second group of the plurality of vehicles, the enhanced rate having a monetary value different from a monetary value of the nominal rate.

4. The method of claim 3, wherein notifying the occupant of the one randomly assigned toll rate comprises notifying the occupant of the first enhanced rate prior to presenting the notified occupant with an opportunity of either entering or exiting the toll thoroughfare; and
further comprising charging for the travel by the occupant's vehicle at the one randomly assigned toll rate if the occupant's vehicle travels after the presented opportunity of entering or exiting the toll thoroughfare.

5. The method of claim 4, further comprising selecting the enhanced rate from a toll cloud of rates centered around the nominal value rate toll, each of the toll cloud rates having different monetary values.

6. The method of claim 4, wherein the plurality of vehicles is less than a totality of traffic flow vehicles on the thoroughfare.

7. The method of claim 6, comprising:
- selecting each of a first group of the plurality of vehicles as function of an ability of each selected first group vehicle to exit or enter the thoroughfare prior to travelling on a segment of the thoroughfare having the usage attribute at a first ingress or egress opportunity;
- selecting each of a second group of the plurality of vehicles as function of an ability of each selected second group vehicle to exit or enter the thoroughfare prior to travelling on the segment at the first ingress or egress opportunity and at a second ingress or egress opportunity, the second ingress or egress opportunity not presented to the first group vehicles; and
- randomly distributing to each one of the second group of vehicles one of the enhanced rate and a greater-enhanced rate of the plurality of different toll rates, the greater-enhanced rate having a monetary value different from the nominal rate monetary value by a value greater than a difference value of the enhanced rate monetary value relative to the nominal rate monetary value.

8. The method of claim 6, comprising:
- assigning a preference to each vehicle of a preferred subset of the plurality of vehicles; and
- the randomly distributing the enhanced rate to the each of the first group comprising preferentially distributing the enhanced rate to the preferred subset vehicles relative to a remainder of the plurality of vehicles.

9. The method of claim 8, comprising selecting each of the preferred subset vehicles as a function of a vehicle criteria associated with the preferred subset vehicles, the criteria selected from the group comprising a vehicle type, a vehicle emissions characteristic, a vehicle fuel efficiency, a historical use of the thoroughfare by the vehicle, and a driving history of a driver of the vehicle.

10. The method of claim 9, comprising iteratively revising at least one of:
- the randomly distributing the enhanced rate;
- the randomly distributing the greater-enhanced rate; and
- the selecting the preferred subset vehicles;
- the iteratively revising a function of feedback from continuing observing of the usage attribute of vehicle traffic presently travelling upon the toll thoroughfare.

11. An article of manufacture, comprising:
- a computer readable tangible storage device having computer readable program code embodied therewith, the program code comprising instructions which, when executed by a computer system comprising a processing unit, cause the computer system to:
  - observe a usage attribute of vehicle traffic travelling upon a toll thoroughfare;
  - compare the observed usage attribute to a threshold;
  - randomly assign each one of a plurality of different toll rates to each of a plurality of vehicles as a function of comparing the observed usage attribute to the threshold, each of the plurality of vehicles either travelling upon the toll thoroughfare or potentially entering the toll thoroughfare;
  - notify an occupant of a vehicle of the plurality of vehicles of a one of the plurality of toll rates randomly assigned to the occupant's vehicle; and
  - cause a charge for travel levied upon the occupant's vehicle to be determined at the one randomly assigned toll rate.

12. The article of manufacture of claim 11, wherein the usage attribute is selected from the group comprising a traffic density value, an average vehicle speed, an average vehicle travel time, an average time for a vehicle to enter the toll thoroughfare, and an average time for a vehicle to exit from the toll thoroughfare; and
- wherein the program code instructions which, when executed on the computer system, causes the computer system to randomly assign each of the plurality of different toll rates by randomly distributing a first enhanced rate to each of a first group of the plurality of vehicles and a nominal rate to a second group of the plurality of vehicles, the enhanced rate having a monetary value different from a monetary value of the nominal rate.

13. The article of manufacture of claim 12, the program code comprising instructions which, when executed on the computer system, causes the computer system to select the enhanced rate from a toll cloud of rates centered around the nominal value rate toll, each of the toll cloud rates having different monetary values.

14. The article of manufacture of claim 12, the program code comprising instructions which, when executed on the computer system, causes the computer system to:
- assign a preference to each vehicle of a preferred subset of the plurality of vehicles; and
- randomly distribute the enhanced rate by preferentially distributing the enhanced rate to the preferred subset vehicles relative to a remainder of the plurality of vehicles.

15. A programmable device comprising:
- a processing means;
- a memory in communication with the processing means comprising a logic component; and
- a network interface in communication with the processing means and the memory;
- wherein the processing means is configured to:
  - compare a usage attribute of vehicle traffic travelling upon a toll thoroughfare to a threshold;
  - randomly assign each one of a plurality of different toll rates to each of a plurality of vehicles as a function of comparing the usage attribute to the threshold, each of the plurality of vehicles either travelling upon the toll thoroughfare or potentially entering the toll thoroughfare;
  - notify an occupant of a vehicle of the plurality of vehicles of a one of the plurality of toll rates randomly assigned to the occupant's vehicle; and
  - cause a charge for travel levied upon the occupant's vehicle to be determined at the one randomly assigned toll rate.

16. The programmable device of claim 15, wherein the usage attribute is selected from the group comprising a traffic density value, an average vehicle speed, an average vehicle travel time, an average time for a vehicle to enter the toll thoroughfare, and an average time for a vehicle to exit from the toll thoroughfare;
- wherein processing means is configured to randomly assign each of the plurality of different toll rates by randomly distributing a first enhanced rate to each of a first group of the plurality of vehicles and a nominal rate to a second group of the plurality of vehicles, the enhanced rate having a monetary value different from a monetary value of the nominal rate.

* * * * *